Aug. 16, 1932.        A. TAUB        1,871,760
LUBRICATING SYSTEM
Filed March 21, 1928        2 Sheets-Sheet 1

Inventor
Alex Taub
By Blackmore, Spencer & Hiit
his Attorneys

Aug. 16, 1932. A. TAUB 1,871,760
LUBRICATING SYSTEM
Filed March 21, 1928 2 Sheets-Sheet 2
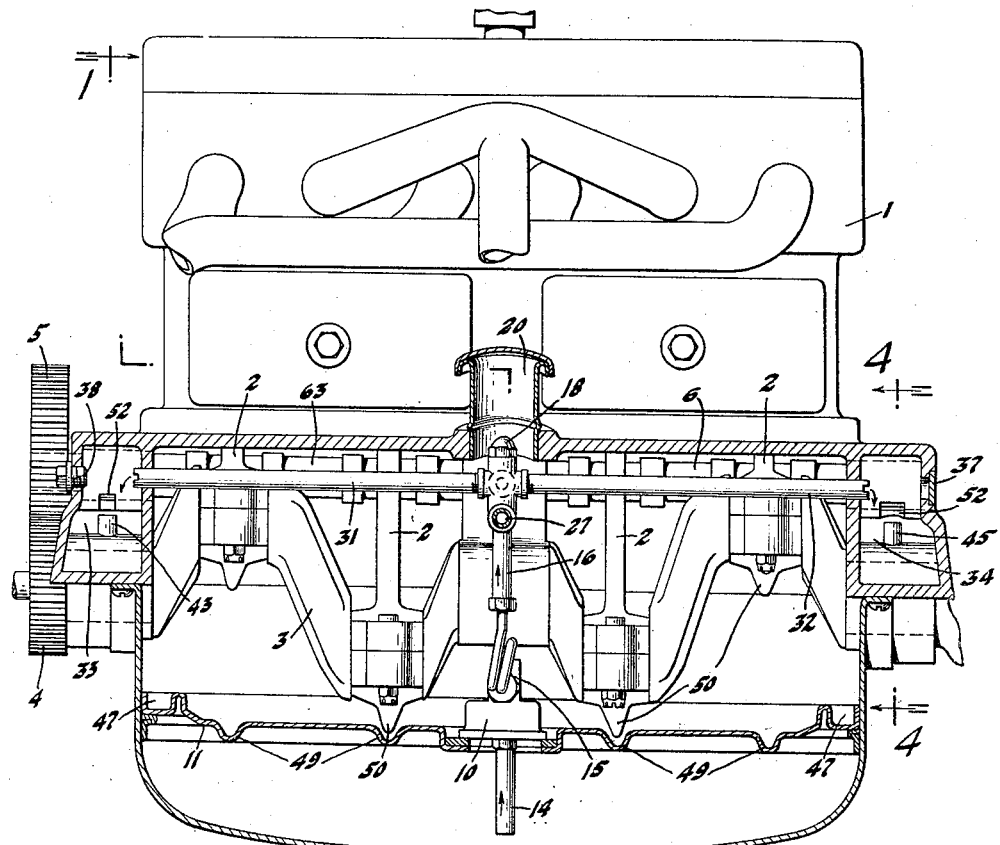
Fig. 5
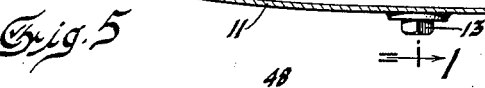
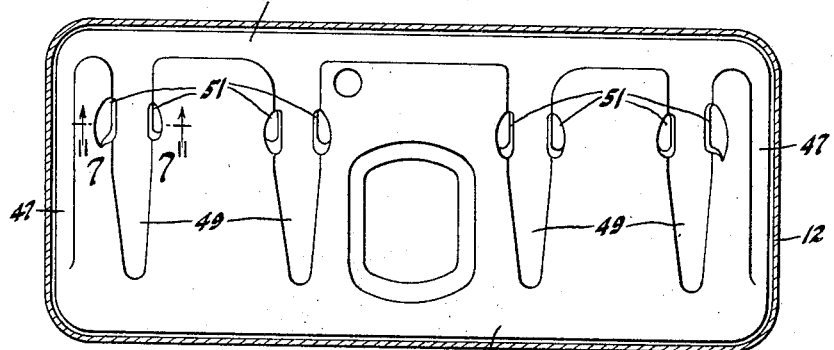
Fig. 6
Fig. 7
Inventor
Alex Taub
By Blackmore Spencer & Flint
his Attorneys Patented Aug. 16, 1932

1,871,760

UNITED STATES PATENT OFFICE

ALEX TAUB, OF DETROIT, MICHIGAN, ASSIGNOR TO GENERAL MOTORS CORPORATION, OF DETROIT, MICHIGAN, A CORPORATION OF DELAWARE

LUBRICATING SYSTEM

Application filed March 21, 1928. Serial No. 263,483.

This invention relates to lubricating systems for internal combustion engines or other similar machinery, and particularly to that type of system wherein oil is delivered to the bearings by a pressure pump located in the oil pan and operated by the engine.

Most pressure feed systems now in general use, consist of a pump in the oil pan which forces oil through a series of pipes or conduits that bend and curve as they lead to the several bearings to be lubricated. In the event the pipe lines become clogged with some foreign material, thereby preventing the flow of oil to the bearings, it is necessary to completely remove the conduits or tubes from the engine to clean out the sediment. This obviously involves considerable trouble and expense. To provide a system of piping that avoids the necessity for dismantling the oiling system to clean the same is one of the objects of the present invention, which contemplates the use of straight pipes so arranged as to permit the introduction therethrough of a ramrod or the like, to clean the passages.

It is a further object of the invention to provide the several bearings to be lubricated with settling basins or chambers into which the pipe lines discharge, whereby the sediment and dirt carried by the oil settles out by gravity as the oil passes on to lubricate the bearings.

Other objects and advantages will be apparent from the following specification taken in connection with the accompanying drawings in which:

Figure 5 is a side elevation of an internal combustion engine, and is taken on line 5—5 of Figure 1.

Figure 6 is a horizontal sectional view of the oil pan showing a troughed plate therein.

Figure 7 is a detail sectional view on line 7—7 of Figure 6.

Figures 1, 2, 3, 4:
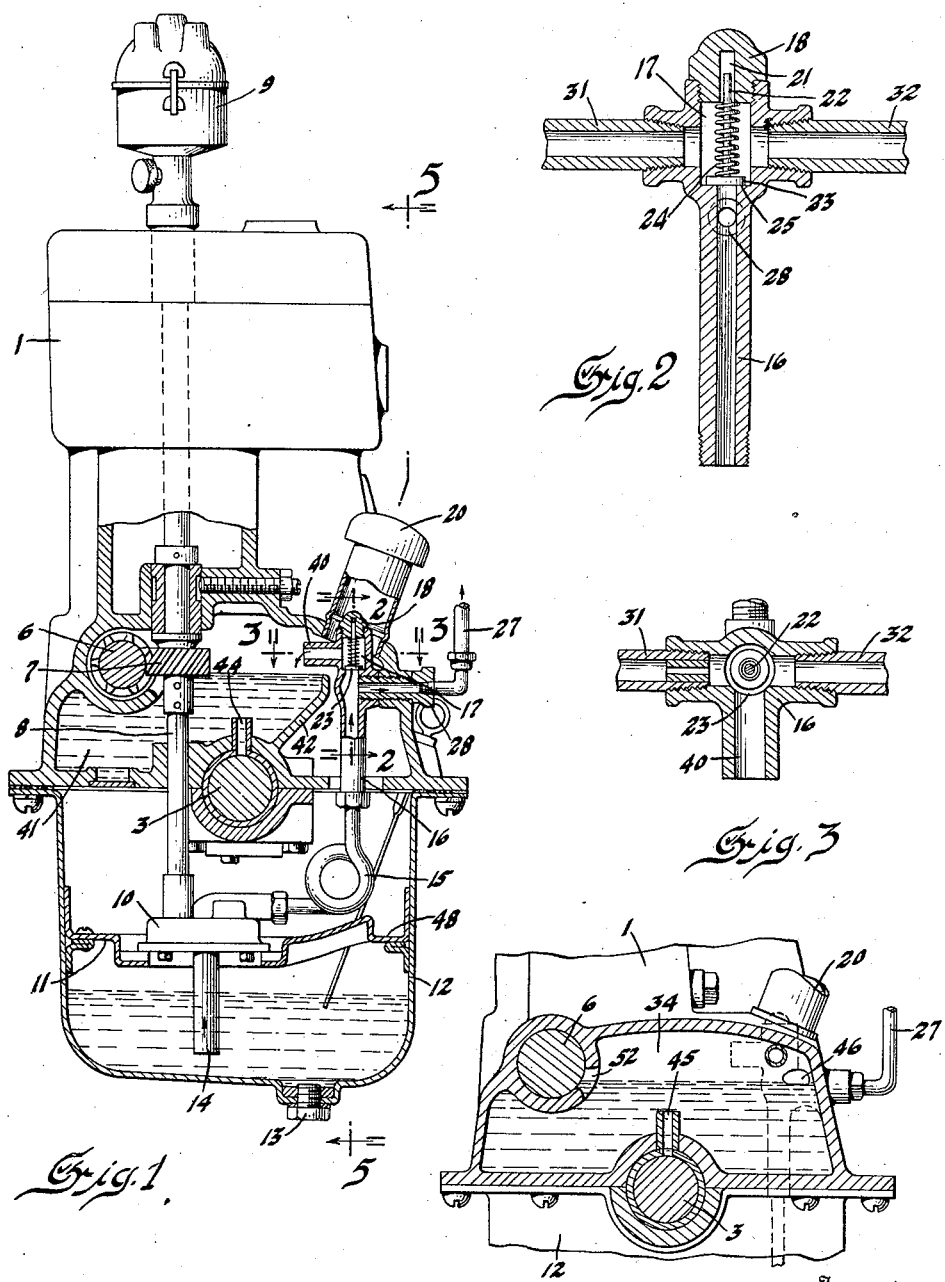
Figure 1 is a front elevation of an internal combustion engine, partly in section as taken on and looking in the direction of the arrows on line 1—1 of Figure 5.
Figure 2 is a detail sectional view taken on line 2—2 of Figure 1.
Figure 3 is a detail sectional view taken on line 3—3 of Figure 1.
Figure 4 is a transverse sectional view of one of the settling chambers and is taken on line 4—4 of Figure 5.

Referring by reference characters to the accompanying drawings, the numeral 1 indicates the cylinder block of an internal combustion engine having a number of reciprocating pistons which transmit the explosion forces through the connecting rods 2 to rotate the crankshaft 3, the rotation of which operates the timing gears 4 and 5 to rotate the camshaft 6, which controls valve elements in ths usual manner. The rotation of the camshaft drives the gear 7 mounted on a shaft 8 to operate the ignition distributor 9 mounted on top of the head of the cylinder block as well as the oil pump 10 which in the present instance is of the gear type, and which is mounted on the bottom of the engine crankcase, in contact with a plate 11 in the oil pan 12 at the bottom of the cylinder block. A removable plug 13 in the bottom of the oil pan permits draining of the oil in the lubrication system at such times as may be necessary.

Oil or other lubricating medium contained in the pan is drawn by the pump through the suction line 14 and discharges through a delivery pipe 15 to a distributor fitting 16. A chamber 17 in the top of the fitting is closed by a plug 18, access to which is had through the breather tube 20. The plug has a locating opening 21 into which extends the stem 22 carrying a valve head 23 and a spring 24 interposed between the plug and head tends to maintain the head on its seat 25, the tension of which spring may be varied by adjustment of the plug. The tension of the spring offers a certain amount of resistance to the flow of oil into the chamber 17 and causes a pressure to be built up, which is indicated upon a suitable pressure gauge, not shown, preferably located on the instrument panel of the vehicle and which communicates through a pipe line or conduit 27 and a screw-threaded fitting 28 with the interior of the distributor fitting 16 below the valve head 23. A pair of straight pipes or conduits 31—32 which, as distinguished from the flexible brass tubing ordinarily used for oil lines, are preferably of iron or other similar material which precludes bending, extend longitudinally of the engine and have screw-threaded engagement within oppositely disposed openings in the fitting 16, so that the passages through the pipes are in alignment with each other. These pipes discharge into settling basins or chambers 33 and 34 respectively integrally formed on opposite ends of the cylinder block directly over the front and rear main bearings for the crankshaft.

In assembling the pipes they are introduced through openings in the side walls or settling chambers and rotated by a suitable tool which engages notches formed in one end of each pipe to thread the opposite end into the distributor fitting 16. The opening in the rear wall of the chamber 34 is closed by an expansion plug 37, while the front opening of the chamber 33 is closed by a removable screw plug 38. In the event the pipe lines become clogged removal of the plug 38, and also the plug 18 and with it the spring and valve, will permit the insertion of a ramrod through the aligned pipes to loosen and push the dirt into the chamber 34. In lieu of using a ramrod for pushing out the dirt a compressed air hose may be coupled in the opening for the screw plug to blow out the dirt.

The distributor fitting 16 also has a laterally extending tubular portion 40 which discharges into a basin or settling chamber 41 formed by an upwardly extending wall 42 at the central or middle crankshaft bearing. Stand pipes 43, 44 and 45 are provided in the chambers 33, 41 and 34 respectively to communicate with the main bearings and from which the oil passes to lubricate the bearings. Any sediment or dirt carried along with the oil will tend to drop or settle to the bottoms of the respective chambers, and the stand pipe extending up into the basin prevents any sediment lying on the bottom from reaching the bearings.

The pipe lines deliver the lubricating oil from the pump faster than the oil passes through the stand pipe, whereby the oil in the settling chamber or basin 41 will run over the top of the side wall and drop onto the plate or catch-pan 11, while that flowing into the chambers 33 and 34 will overflow and pass through openings 46 formed in the innermost wall of each chamber and drop into the channels 47 in the plate or catch-pan 11. The oil that drops on the plate will flow into the main channel 48 along one side, and then into the series of grooves or troughs 49 into which dip the splash tongues 50 on the bearing caps of the connecting rods 2.

Overflow orifices 51 formed in the sides of the grooves 49 permit the oil to drain back into the oil pan. The bearings for the camshaft are so located that they extend below the level of the oil standing in the settling chambers, and are each provided with an entrance opening as indicated at 52 through which the oil may reach the bearing surfaces thereof. Thus the oil in the settling chambers lubricates both the crankshaft bearings and the camshaft bearings, both of which have communicating passages leading into the chambers above the bottom wall, whereby only the cleaner oil in the upper level is permitted to reach the bearings.

While the above description has been quite specific, it is to be understood that such modifications may be made as come within the scope of appended claims.

I claim:

1. In a lubricating system for internal combustion engines, the combination with a sedimentation chamber that opens into the engine crank case for the overflow of excess lubricant, a straight inflexible oil delivery passageway leading thereto and from which foreign material that tends to clog the passageway may be forced into the settling chamber.

2. In a lubricating system for internal combustion engines, the combination with a pair of spaced settling chambers, an oil line extending between and discharging into said chambers, a removable plug closing an opening in the wall of one of said chambers arranged in alignment with the passageway through said oil line.

3. In a lubricating system for internal combustion engines, the combination with a pair of shaft bearings at opposite ends of the engine block, settling chambers located above and having communication with the bearings, a longitudinally extending pipe line discharging into the respective chambers and a removable closure for an opening in the wall of one of the chambers that is in alignment with the passageway through the pipe line, the removal of which closure permits the introduction of a ramrod through the line for pushing accumulated sediment out of the line.

4. In a lubricating system for internal combustion engines, a series of settling chambers associated respectively with main crankshaft bearings and from which the lubricant may overflow at a certain level, a stand pipe in each chamber communicating with the bearings to be lubricated, camshaft bearings located adjacent the settling chambers and having entrance openings for lubricant located below the oil level in the chambers, and pipe lines leading from a pressure pump and continuously discharging into said chambers.

5. In a lubricating system for internal combustion engines, the combination with a distributor fitting associated with the delivery line of a pressure pump and located intermediate the ends of the cylinder block, a pair of settling chambers at opposite ends of the block having openings in the walls thereof in alignment with openings in the distributor fitting, a pair of straight pipes engageable with the openings in the fitting and extending through the openings in the walls of the settling chambers to discharge into said chambers, and a removable closure for an opening in one chamber in alignment with the passageway through the pipes, the removal of said plug permitting the insertion of a ramrod through the pipes for pushing deposited sediment into the other chamber.

6. In an internal combustion engine, a crankcase, sediment chambers formed integral with the end walls of the crankcase, directly over the front and rear main crankshaft bearings and in direct open communication with the interior of the crankcase, a stand pipe extending upwardly into each chamber above the bottom thereof and leading to the bearing, and means to supply said chambers with lubricant from within the crankcase, including an inflexible pipe having open ends and a straight passageway from end to end and which extends from one chamber to the other, and a removable plug closing an end wall opening directly in line with said passageway.

7. In an internal combustion engine, a crankcase provided with a plurality of sediment chambers for lubricant, each being in direct open communication with the interior of the crankcase and from which excess lubricant overflows into the crankcase, crankshaft and camshaft bearings carried by the crankcase adjacent each of said chambers and having openings into and above the bottom of the chambers, and means to supply lubricant to each of said chambers, including a straight inflexible pipe line extending from one chamber to another and having open ends, whereby it may be cleaned of foreign material without necessitating its removal from the engine.

8. In an internal combustion engine, a crankcase provided with a plurality of sediment chambers for lubricant, each being in direct open communication with the interior of the crankcase and from which excess lubricant overflows into the crankcase, crankshaft and camshaft bearings carried by the crankcase adjacent each of said chambers and having openings into and above the bottom of the chambers, and continuously driven engine actuated means to supply lubricant to each chamber in such amount as to provide a continual overflow from each chamber.

9. In an internal combustion engine, a crankcase provided with a plurality of sediment chambers for lubricant, each being in direct open communication with the interior of the crankcase and from which excess lubricant overflows into the crankcase, crankshaft and camshaft bearings carried by the crankcase adjacent each of said chambers and having openings into and above the bottom of the chambers, and continuously driven engine actuated means to supply lubricant to each chamber in such amount as to provide a continual overflow from each chamber, and a catch pan beneath the several chambers to receive the lubricant overflow therefrom, and provided with troughs into which splash elements dip.

In testimony whereof I affix my signature.

ALEX TAUB.